Jan. 15, 1957  C. D. GREAVES ET AL  2,777,806
METHOD OF PRODUCING A CARBON TUBE FROM COAL
Filed Oct. 31, 1950
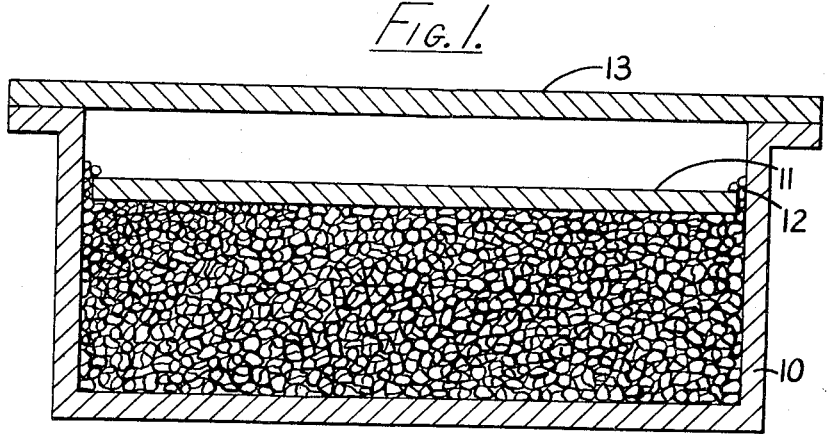
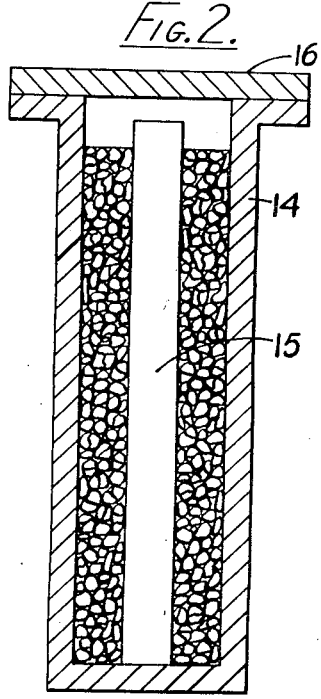
Inventors
Charles D. Greaves and
Bernard R. Atkins
By
Watson, Cole, Grindle & Watson
Attorneys United States Patent Office 2,777,806
Patented Jan. 15, 1957

2,777,806
METHOD OF PRODUCING A CARBON TUBE FROM COAL

Charles Desmond Greaves and Bernard Roy Atkins, London, England, assignors to C. D. Patents Limited, London, England, a British company Application October 31, 1950, Serial No. 193,313

Claims priority, application Great Britain November 23, 1949

2 Claims. (Cl. 202—29)

This invention relates to the production of porous carbon articles, and it is envisaged that an important use of such articles will be in the manufacture of fluorine as porous electrodes.

The main object of the invention is the production of such carbon articles, particularly, but not exclusively, in the form of strong discs, plates, rods and bars, having a desired degree of porosity.

According to the invention, there is provided a method of producing porous carbon articles comprising the subdivision and size-grading of a strongly coking coal to a degree dependent upon the final porosity required, filling the graded coal particles into a container of refractory material and heating the container in a non-oxidising atmosphere so as to effect carbonisation, the final temperature being above 550° C. and the rate of temperature rise being so restricted as to cause adequate heating of the particles without producing intumescence in any part.

In determining the rate of firing the following factors have to be borne in mind:

1. Size of the object.
2. Size of the individual coal particles and the size range of particles within the bed.
3. The agglutinating power of the coal used.

It will be appreciated that the process of agglutination or sintering does not commence below a temperature which may range between 325° C.–425° C. Secondly, during the process of raising the temperature of a bed of loose particles, which necessarily possess an extremely low thermal conductivity, an appreciable thermal gradient across the bed is produced. If this gradient is not to produce unevenness of sintering during the later stages of the process, then it is desirable to maintain the bed of particles at a temperature of about 350° C. for a sufficient period to produce substantial thermal equilibrium. This precaution is particularly important in the case of large particles.

For reasons which will subsequently appear, it is desirable to maintain the bed of coal particles within the container under a moderate pressure during the firing cycle. A pressure of some twenty pounds per square foot has been found satisfactory in the case of a bed of particles contained in a rectangular container for the purpose of obtaining a rectangular block of porous carbon. In this latter case it has been found convenient to apply this pressure by means of a steel plate resting on the top of the bed of particles in the container. The interparticulate pressure in a bed of particles is due to gravitational thrust and is therefore greatest at the bottom of the bed and least at the top thereof where it is almost zero. The effect of the pressure maintained for example by means of a steel plate is to ensure that the topmost particles are subjected to pressure so as to produce a more uniformly sintered product. This pressure also serves to counteract the tendency of the topmost particles of the bed to be dislodged by volatile matter from the bed during firing—a tendency that results in a weak product. In the case of a pressure plate, it will be obvious that, in order to be effective, this must be clear of the walls of the container which results in the topmost particles immediately beneath the narrow clearance between the edges of the plate and the walls of the container not being subjected to pressure from the plate. In order that this effect may be offset, a ridge of coal particles is placed over the clearance (i. e. resting against the walls of the container, partly on the bed of particles and partly on the pressure plate), the quantity of such additional coal particles being sufficient to compensate for the shrinkage of the whole bed of particles away from the walls of the container during the process of carbonisation.

The pore size of the carbonised article is controlled by the average particle size within the bed. The porosity, however, which is the ratio of the total volume of interstices to the total volume of the solid matrix, is less dependent on particle size and is substantially controlled by (a) varying particle size distribution; a bed of particles of nearly uniform size results in a more porous artifact than one having particles of different size, and (b) varying the degree of compaction of the bed; agitation or vibration during the process of packing the container tends to cause close packing thus yielding a less porous product. It is important to realise that a body with a lower porosity needs a slower rate of firing than one with a higher porosity.

The method of the invention will now be illustrated with reference to the following examples which are illustrated in the accompanying drawing, in which:

Figure 1 is a cross-sectional view of a rectangular container, pressure plate and lid in position for firing the coal, and Figure 2 is a cross-sectional view of a cylindrical container and lid containing coal before firing.

Example I

A strongly coking coal was crushed and screened, those particles being retained that passed a sieve of 1 millimetre mesh and rested on a sieve of ½ millimetre mesh. The coal particles thus graded, were transferred to a steel box 10 measuring 16" long x 14" wide x 6" deep until the depth of particles was 4", whereupon the top surface was levelled and a steel plate 11 measuring 15¾" x 13¾" x ½" placed on top. A ridge 12 of coal particles was then placed on top of the plate along its edges and the lid 13 of the box was sealed on.

The box was then heated in a gas furnace at a controlled rate of temperature rise, i. e. the temperature was allowed to rise to 350° C. at the rate of 100° C. per hour and was then maintained during a period of 10 hours; thereafter the temperature was increased to 650° C. at 10° C./hr. and subsequently from 650° to 850° C. at 20° C./hr. After cooling it was found that the particles had compacted into a block 13½" x 12" x 3½", the edges of which were somewhat friable. By machining to 13" x 11" x 3" a hard strong slab of porous carbon was obtained.

Example II

When it was desired to produce a block of greater thickness (i. e. 6") without firing at an undesirably slow rate, a proportion of 10% of particles of carbon, of similar size to the particles of coal was admixed therewith. These carbon particles were prepared by mixing with graded coal a sufficient quantity of sulphur (1%–5%) to prevent agglutination and firing the mixture in sealed containers to a temperature of 850° C. The mixture of coal and carbon particles was packed and fired in a similar manner to that described in Example I.

Example III

A strongly coking coal was crushed and sieved between screens of ½ mm. and ¼ mm. apertures respectively and was filled into a cylindrical steel container 14 measuring 12″ long and 3″ in internal diameter into which a cardboard cylinder 15 measuring 12″ long and 1″ in external diameter had been previously inserted co-axially with the container. The container was then caused to vibrate in order to increase the compaction of the particles, whereafter it was sealed by lid 16 and fired in a vertical position in a gas furnace, according to the following firing schedule:

Up to 200° C. at 50° C./hr.
200° C. to 350° C. at 20° C./hr.
350° C. to 450° C. at 10° C./hr.
450° C. to 550° C. at 20° C./hr.
550° C. to 975° C. at 50° C./hr.

On cooling, the container was opened and found to contain a porous carbon tube of approximate external diameter 2½″ and internal diameter ¾″, the cardboard tube having itself charred and shrunk to such a degree as not to have interfered with the shrinkage of the porous carbon.

What we claim is:

1. A method of producing a porous carbon tube from strongly coking coal, which process comprises filling the coal, all of which passes a sieve of ½ millimeter mesh and rests on a sieve of ¼ millimeter mesh, into an annular cavity between an inner cardboard cylinder and an outer co-axial, refractory, cylindrical container, vibrating the container when it is in an upright position and thereby compacting the coal without applying external pressure thereto, sealing the container, and firing the container and its contents in an upright position to a temperature of above 550° C. at a rate of temperature rise so restricted as to avoid intumescence of the coal.

2. A method of producing a porous carbon tube from strongly coking coal, which process comprises filling the coal, all of which passes a sieve of ½ millimeter mesh and rests on a sieve of ¼ millimeter mesh, into an annular cavity between a cardboard cylinder and an outer, co-axial, cylindrical steel container, vibrating the container in a vertical position and thereby increasing the compaction of the coal, and, without applying external pressure to the coal; sealing the container and firing it and its contents in a vertical position according to the following firing schedule:

Up to 200° C. at 50° C. per hour.
200° C. to 350° C. at 20° C. per hour.
350° C. to 450° C. at 10° C. per hour.
450° C. to 550° C. at 20° C. per hour.
550° C. to 975° C. at 50° C. per hour.

References Cited in the file of this patent

UNITED STATES PATENTS

| | | |
|---|---|---|
| 279,400 | Koyl | June 12, 1883 |
| 538,289 | Shrewsbury et al. | Apr. 30, 1895 |
| 653,468 | Burke | July 10, 1900 |
| 1,458,964 | Baille-Barrelle | June 19, 1923 |
| 1,593,208 | Culmer | July 20, 1926 |
| 1,593,697 | Illingworth | July 27, 1926 |
| 1,680,613 | Hennebutte et al. | Aug. 14, 1928 |
| 1,912,002 | Locbell | May 30, 1933 |
| 2,085,903 | Fitz | July 6, 1937 |
| 2,161,014 | Brown | June 6, 1939 |
| 2,162,834 | Breitback | June 20, 1939 |
| 2,234,769 | McCullock | Mar. 11, 1941 |
| 2,247,185 | Caccioppoli | June 24, 1941 |
| 2,535,127 | Frei | Dec. 26, 1950 |
| 2,594,226 | Shea | Apr. 22, 1952 |

OTHER REFERENCES

Gas, Coke and Byproduct-Making Properties of American Coals and their Determination, by A. C. Fieldman and J. D. Davis, 1934, pp. 124–127.

Chemistry of Coal Utilization, H. H. Lowry, vol. 1, pp. 856–857, John Wiley and Sons, copyright 1945.